US011307289B2

(12) United States Patent
Inoue (10) Patent No.: US 11,307,289 B2
(45) Date of Patent: Apr. 19, 2022

(54) RADAR DEVICE AND METHOD FOR CHANGING RECEPTION GAIN OF RADAR DEVICE

(71) Applicant: FURUNO ELECTRIC CO., LTD., Hyogo (JP)

(72) Inventor: Shuhei Inoue, Hyogo (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 167 days.

(21) Appl. No.: 16/639,732

(22) PCT Filed: Jul. 31, 2018

(86) PCT No.: PCT/JP2018/028531
§ 371 (c)(1),
(2) Date: Feb. 17, 2020

(87) PCT Pub. No.: WO2019/035348
PCT Pub. Date: Feb. 21, 2019

(65) Prior Publication Data
US 2021/0124012 A1 Apr. 29, 2021

(30) Foreign Application Priority Data

Aug. 18, 2017 (JP) .............................. JP2017-158178

(51) Int. Cl.
*G01S 7/34* (2006.01)
*G01S 7/40* (2006.01)
*G01S 13/95* (2006.01)

(52) U.S. Cl.
CPC ............... *G01S 7/34* (2013.01); *G01S 7/40* (2013.01); *G01S 7/4021* (2013.01); *G01S 13/95* (2013.01)

(58) Field of Classification Search
CPC .......... G01S 13/95; G01S 7/34; G01S 7/4021; G01S 7/025; G01S 7/40; G01S 7/4069;
(Continued)

(56) References Cited

U.S. PATENT DOCUMENTS 6,297,764 B1  10/2001  Wormington et al.
2005/0136868 A1  6/2005  Jun et al.
(Continued)

FOREIGN PATENT DOCUMENTS

FR  3030774  6/2016
JP  H06242223  9/1994
(Continued)

OTHER PUBLICATIONS

"International Search Report (Form PCT/ISA/210) of PCT/JP2018/028531," dated Oct. 23, 2018, with English translation thereof, pp. 1-3.
(Continued)

*Primary Examiner* — Timothy X Pham
(74) *Attorney, Agent, or Firm* — JCIPRNET (57) ABSTRACT

A radar device (1) includes a frequency conversion part (12) which converts a frequency of an echo signal obtained by reflecting a detection signal and receiving the reflected detection signal by an antenna (10), and amplifies a signal level thereof. The radar device (1) includes a path switching part (20) which outputs, as a calibration signal, to the frequency conversion part (12), the transmission signal output by the transmission signal generation part (11) at a timing while the transmission signal is output to the antenna (10). A gain adjustment part (23) changes an amplification gain of the frequency conversion part (12) on the basis of a signal level of the calibration signal input to the frequency conversion part (12) and a signal level of the calibration signal having been amplified by the frequency conversion part (12).

11 Claims, 2 Drawing Sheets (58) Field of Classification Search
CPC ........... G01S 2007/4069; G01S 7/4008; G01S 7/4052; G01S 7/282; G01S 13/28; G01S 7/03; G01S 7/35; G01S 7/4004; G01S 13/0209; G01S 7/2921; G01S 7/36; G01S 7/4095; G01W 1/00; Y02A 90/10; H03F 1/3247; H03F 3/24; H04B 17/21
See application file for complete search history.

(56) References Cited

U.S. PATENT DOCUMENTS

| | | | |
|---|---|---|---|
| 2012/0050094 A1 | 3/2012 | Nakabayashi et al. | |
| 2015/0247920 A1 | 9/2015 | Asada et al. | |
| 2020/0088864 A1* | 3/2020 | Kim .................... | G01S 13/0209 |

FOREIGN PATENT DOCUMENTS

| | | |
|---|---|---|
| JP | 2001201560 | 7/2001 |
| JP | 2006343131 | 12/2006 |
| JP | 2009031194 | 2/2009 |
| JP | 2012532311 | 12/2012 |
| WO | 2014045926 | 3/2014 |
| WO | 2016096250 | 6/2016 |

OTHER PUBLICATIONS

"Search Report of Europe Counterpart Application", dated Apr. 6, 2021, pp. 1-9.
"Office Action of India Counterpart Application", dated Sep. 24, 2021, with English translation thereof, pp. 1-5.

* cited by examiner

RADAR DEVICE AND METHOD FOR CHANGING RECEPTION GAIN OF RADAR DEVICE

CROSS-REFERENCE TO RELATED APPLICATION

This application is a 371 application of the International PCT application serial no. PCT/JP2018/028531, filed on Jul. 31, 2018, which claims the priority benefits of Japan Patent Application No. 2017-158178, filed on Aug. 18, 2017. The entirety of each of the above-mentioned patent applications is hereby incorporated by reference herein and made a part of this specification.

Technical Field

The disclosure mainly relates to a radar device which transmits a detection signal from an antenna and receives, by the antenna, a reflected wave obtained by reflection of the detection signal.

Description of Related Art

Conventionally, a configuration for controlling a gain when a reflected wave is received and amplified in a radar device is known. Patent Document 1 discloses this type of radar device.

Patent Document 1 discloses an atmospheric radar which radiates radio waves in the air, receives radio waves reflected by the atmosphere, and processes the reception signals to measure the state of the atmosphere in the sky. This atmospheric radar includes a frequency conversion means which converts a frequency of a reception signal from a radio frequency to an intermediate frequency, a gain control means which adjusts a gain of a receiver, and a gain determining means which obtains an optimal gain of a receiver of the atmospheric radar using atmospheric data obtained by signal processing. The gain of the receiver is automatically adjusted by setting the gain of the gain control means to a gain value determined by the gain determining means.

According to this configuration, even when the reception level of the atmospheric echo varies radically, Patent Document 1 can automatically adjust to the optimal receiver gain and perform the optimal observation corresponding to the characteristic of the atmospheric echo at the time of observation.

RELATED ART

Patent Document

[Patent Document 1] Japanese Laid-Open No. 2001-201560

SUMMARY

Technical Problem

In the frequency conversion means and gain control means included in the radar device of Patent Document 1, generally, a large number of components are used, and individual differences and temperature characteristics of individual components are superimposed, and the gain of the receiver is affected in a complicated way. Therefore, it is difficult to calibrate nonuniformity of the gain of the receiver without an actual measurement.

In recent years, in the field of weather radars, a dual polarization radar which transmits and receives two polarized waves orthogonal to each other (a vertically polarized wave and a horizontally polarized wave) at the same time has been used to estimate the intensity of rainfall and the like with high accuracy. In addition, for purposes such as expanding the observation area and improving the accuracy of observation, a radar network is constructed by installing multiple radar devices. In such a configuration, if there is a deviation in gains between the reception channel of the vertically polarized wave and the reception channel of the horizontally polarized wave, or if there is a deviation in the reception gains between multiple radars, the measurement accuracy will be greatly reduced.

In this regard, in the configuration of Patent Document 1, the gain of the receiver is adjusted based on the atmospheric data obtained by signal-processing the reception signals. The atmospheric data are affected by individual differences and the like in the frequency conversion means and the gain control means, and at the same time, they are also affected by the state of the surrounding atmosphere. Therefore, although the configuration of Patent Document 1 can realize the gain adjustment automation itself, it cannot stably cancel the nonuniformity caused by the individual differences and the temperature characteristics of the frequency conversion means and the gain control means included in individual radars.

In radar devices, conventionally, an operator manually adjusts the gain while measuring the actual gain. In some cases, before shipment from the factory, a temperature characteristic curve is experimentally obtained by measuring the gain in an environment with different temperatures, and this temperature characteristic is set in the radar device, and calculations are performed to cancel the temperature characteristic by signal processing. In addition, in dual polarization radars, it is also known to perform calibration with the sun in order to eliminate the nonuniformity in reception gains between the reception channel of the vertically polarized wave and the reception channel of the horizontally polarized wave.

However, such work is complicated, and a long time is required for the adjustment work. In addition, there is also a risk of human error in manual adjustment.

Furthermore, when the gain of a radar that has already started operating is to be adjusted, since it is necessary to take out components such as a substrate and the like from the inside of the device, the work requires a long time. In addition, since it is necessary to stop the operation of the radar for a long time, improvement has been desired particularly in the weather radars in which continuity of measurement is important.

The disclosure has been made in view of the above circumstances, and an object of the disclosure is to provide a radar device which is capable of accurately and automatically calibrating nonuniformity of a gain caused by individual differences, temperature characteristics or the like of components of a frequency conversion part.

Solution to the Problem and Effects

The problems to be solved by the disclosure are as described above, and means for solving the problems and effects thereof will be described below.

According to a first aspect of the disclosure, a radar device having the following configuration is provided. That is, the radar device includes a transmission signal generation part, a frequency conversion part, a signal processing part, a path switching part, and an amplification gain changing part. The transmission signal generation part repeatedly generates, at a time interval, a transmission signal to be output to an antenna in order to transmit a detection signal from the antenna. The frequency conversion part converts a frequency of an echo signal obtained by reflecting the detection signal and receiving the detection signal by the antenna, and amplifies a signal level thereof, within a period from a time when the transmission signal generation part completes outputting the transmission signal to the antenna to a time when a next one of the transmission signal starts to be output to the antenna. The signal processing part processes and outputs a signal input from the frequency conversion part. The path switching part outputs the transmission signal output by the transmission signal generation part to the frequency conversion part as a calibration signal at a timing while the transmission signal is being output to the antenna. The amplification gain changing part changes an amplification gain of the frequency conversion part based on a signal level of the calibration signal input to the frequency conversion part and a signal level of the calibration signal having been amplified by the frequency conversion part.

In this way, a current gain can be experimentally obtained and automatically controlled for the frequency conversion part that generally has a large number of components and a complicated behavior of gain deviation. Therefore, nonuniformity of the gain caused by the individual differences, the temperature characteristics or the like of the components of the frequency conversion part can be accurately and automatically calibrated. Moreover, since the current gain is detected by using the calibration signal, an automatic control of the gain can be realized without much complicating the configuration.

In the radar device, the following configuration is preferable. That is, the radar device includes a transmission and reception switching part and an amplification part. The transmission and reception switching part separates signal paths, causes the transmission signal generated by the transmission signal generation part to be output to the antenna, and causes the echo signal received by the antenna to be output to the frequency conversion part. The amplification part amplifies and outputs to the frequency conversion part a signal input from the transmission and reception switching part. An input of the echo signal from the amplification part to the frequency conversion part is blocked while the transmission signal generation part is outputting the transmission signal to the antenna.

In this way, while the calibration signal is being input to the frequency conversion part, a transmission leakage signal can be prevented from being input to the frequency conversion part by the transmission and reception switching part. As a result, the current gain can be accurately detected and controlled.

In the radar device, the following configuration is preferable. That is, the path switching part includes a calibration signal path which is a signal path in which the transmission signal output by the transmission signal generation part is output to the frequency conversion part as a calibration signal. The path switching part disconnects the calibration signal path before the transmission signal generation part completes outputting the transmission signal to the antenna.

In this way, it is possible to reliably prevent the calibration signal from being input to the frequency conversion part when it receives the echo signal.

In the radar device, it is preferable that the path switching part connects the calibration signal path before the transmission signal generation part starts outputting the transmission signal to the antenna.

In this way, a time margin for obtaining the amplification gain of the frequency conversion part can be ensured easily.

In the radar device, it is preferable that the amplification gain changing part changes the amplification gain of the frequency conversion part based on at least a temperature characteristic of the transmission and reception switching part which is disposed between the frequency conversion part and the antenna and switches signal paths.

In this way, the gain of the frequency conversion part can be controlled in consideration of a temperature characteristic of a component that is not the components forming the frequency conversion part.

In the radar device, the following configuration is preferable. That is, the frequency conversion part has two channels which frequency-convert two polarized waves orthogonal to each other and amplify signal levels thereof, respectively. The amplification gain changing part changes amplification gains of the respective channels, and makes a ratio of a signal level of the calibration signal input to the respective channels to a signal level of the calibration signal having been amplified by the respective channels be consistent between the two channels.

In this way, the gain deviation between the two polarized waves can be appropriately eliminated.

In the radar device, it is preferable that the amplification gain of the frequency conversion part is changed by the amplification gain changing part without stopping transmission of the detection signal from the antenna and without changing a transmission interval of the detection signal.

In this way, the gain adjustment can be performed at the same time without interrupting the detection around the antenna.

In the radar device, the following configuration is preferable. That is, the radar device includes a gain target value storage part which stores a gain target value which is a target value of a gain of the frequency conversion part or a target value of a gain of a reception signal path including the frequency conversion part. The amplification gain changing part changes the amplification gain of the frequency conversion part based on the gain target value stored in the gain target value storage part. The gain target value stored in the gain target value storage part is configured to be changeable.

In this say, the reception gain can be flexibly changed according to the situation. Further, the gain can be changed by simple work of changing the gain target value.

In the radar device, it is preferable that the signal processing part is capable of outputting the calibration signal that has been frequency-converted and amplified by the frequency conversion part.

In this way, by checking the waveform of the calibration signal to be output, it can be used for maintenance work, for example.

In the radar device, it is preferable that the radar device obtains weather observation data.

That is, the disclosure, which can obtain and automatically control the current reception gain in the frequency conversion part, is particularly preferably applicable to a weather radar that requires obtaining accurate weather observation data.

According to a second aspect of the disclosure, a method for changing a reception gain of a radar device as follows is provided. That is, a transmission signal to be output to an antenna in order to transmit a detection signal from the antenna is repeatedly generated at a time interval. A frequency of an echo signal obtained by reflecting the detection signal and receiving the detection signal by the antenna is converted, and a signal level thereof is amplified, by a frequency conversion part, within a period from a time when output of the transmission signal to the antenna is completed to a time when a next one of the transmission signal starts to be output to the antenna, and processing on an amplified signal is performed. The transmission signal is input to the frequency conversion part as a calibration signal at a timing while the transmission signal is being output to the antenna, and a frequency of the calibration signal is converted by the frequency conversion part, and a signal level thereof is amplified. An amplification gain of the frequency conversion part is changed based on a signal level of the calibration signal input to the frequency conversion part and a signal level of the calibration signal having been amplified by the frequency conversion part.

In this way, a current gain can be experimentally obtained and automatically controlled for the frequency conversion part that generally has a large number of components and a complicated behavior of gain deviation. Therefore, nonuniformity of the gain caused by the individual differences, the temperature characteristics or the like of the components of the frequency conversion part can be accurately and automatically calibrated. Moreover, since the current gain is detected by using the calibration signal, an automatic control of the gain can be realized without much complicating the configuration.

DESCRIPTION OF THE EMBODIMENTS

Figure 1:
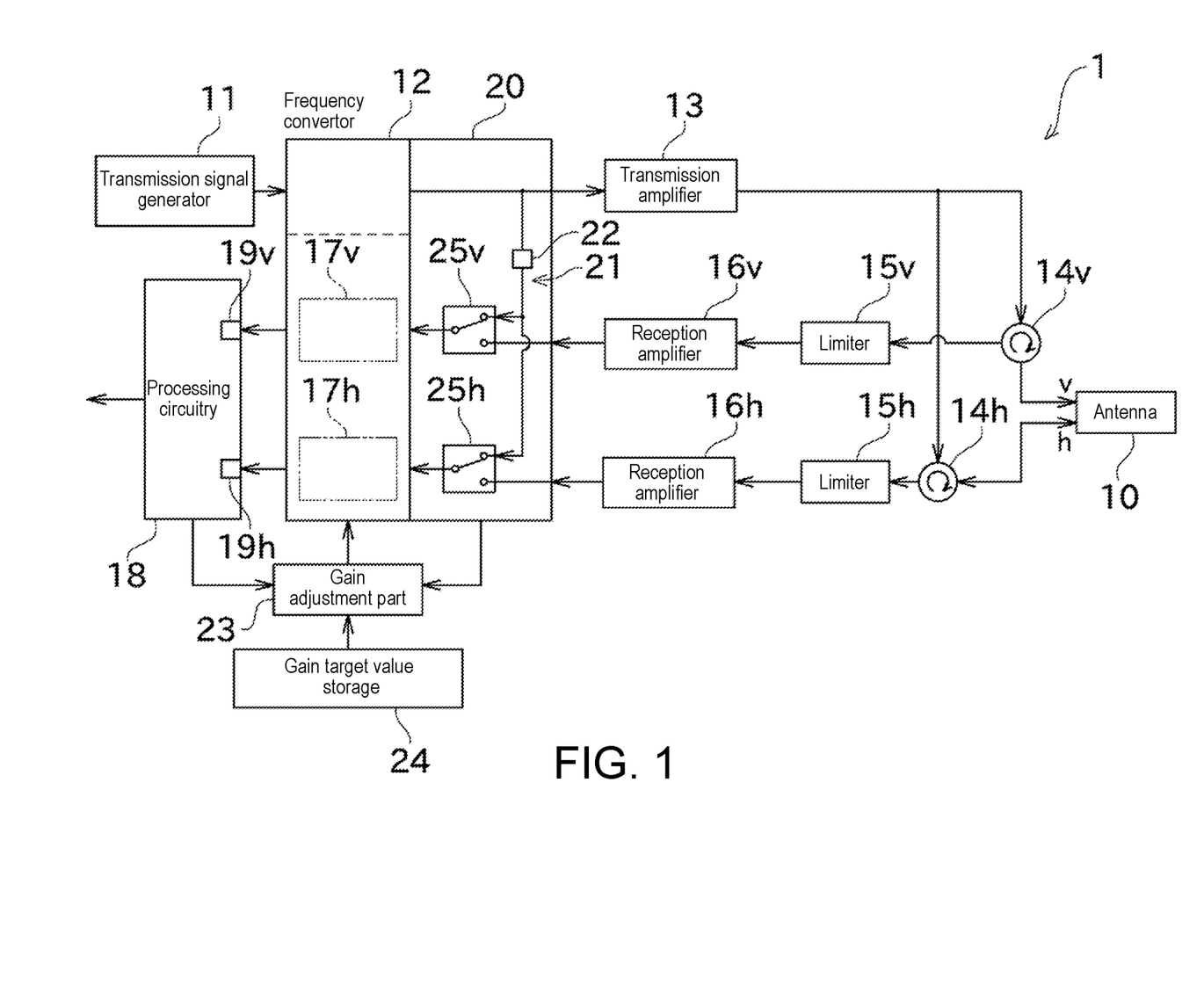
FIG. 1 is a block diagram showing a configuration of a radar device according to an embodiment of the disclosure.
Figure 2:
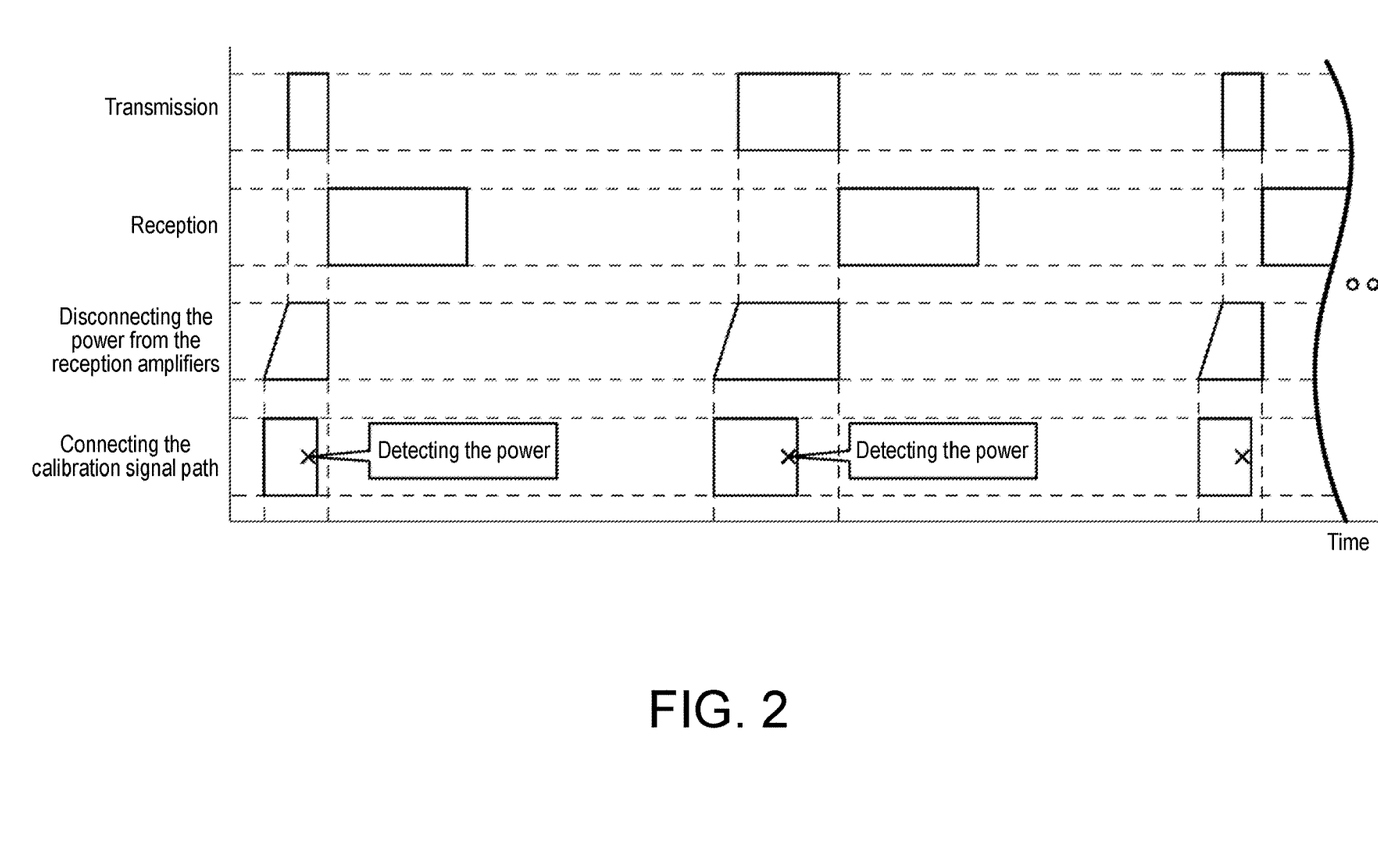
FIG. 2 is a timing chart showing the timing at which processing for adjusting a reception gain is performed in relation to transmission and reception in the radar device.

Next, embodiments of the disclosure will be described with reference to the drawings. FIG. 1 is a block diagram showing a configuration of a radar device 1 according to an embodiment of the disclosure. FIG. 2 is a timing chart showing the timing at which processing for adjusting a reception gain is performed in relation to transmission and reception in the radar device 1.

The radar device 1 shown in FIG. 1 is configured as a dual polarization type Doppler weather radar using a semiconductor for a transmission part. The radar device 1 can obtain weather observation data by transmitting and receiving, by an antenna 10, two radio waves oscillating in directions orthogonal to each other (specifically, a vertically polarized wave and a horizontally polarized wave).

The radar device 1 includes the antenna 10, a frequency conversion part (frequency convertor) 12, and circulators (transmission and reception switching parts) 14v and 14h as a common configuration for transmission and reception.

A transmission system circuit of the radar device 1 includes a transmission signal generation part 11 (transmission signal generator) and a transmission amplifier 13 in addition to the frequency conversion part 12 described above.

The transmission signal generation part 11 generates transmission IF signals (IF means intermediate frequency) of the vertically polarized wave and the horizontally polarized wave in response to a signal from a control part (not shown). The transmission signal generation part 11 outputs the generated transmission IF signals to the frequency conversion part 12.

The frequency conversion part 12 converts the transmission IF signals input from the transmission signal generation part 11 into transmission RF signals (RF means radio frequency) having a higher frequency. The frequency conversion part 12 outputs the converted transmission RF signals to the transmission amplifier 13.

The transmission amplifier 13 amplifies the input transmission RF signals. The transmission amplifier 13 outputs transmission pulse signals, which are signals obtained by amplification, to the antenna 10 via the two circulators 14v and 14h.

Both the transmission RF signals and the transmission pulse signals described so far are derived from the transmission IF signals generated by the transmission signal generation part 11 for transmitting detection signals from the antenna 10. Therefore, it can be said that all of the transmission IF signals, the transmission RF signals, and the transmission pulse signals are transmission signals that are substantially generated by the transmission signal generation part 11 and output to the antenna 10.

The circulators 14v and 14h separate signal paths. More specifically, the circulators 14v and 14h cause high-energy transmission signals from the transmission amplifier 13 to be output to the antenna 10 during transmission of the transmission signals, but not to be output to a reception system circuit. Further, the circulators 14v and 14h cause the reception signals from the antenna 10 to be output to the reception system circuit, but not to be output to the transmission system circuit.

The antenna 10 has a known configuration and is configured to repeat transmission and reception of radio waves while rotating at a particular rotation cycle and changing an elevation angle. In this way, a substantially hemispherical three-dimensional space with the antenna 10 as the center can be scanned. The radar device 1 is configured as a dual polarization radar, and performs transmission and reception of the vertically polarized wave and the horizontally polarized wave by one antenna 10.

The radar device 1 includes a reception circuit of the vertically polarized wave and a reception circuit of the horizontally polarized wave as the reception system circuit. In FIG. 1, the frequency conversion part 12 and a signal processing part (processing circuitry) 18 are shown as blocks common for the vertically polarized wave and the horizontally polarized wave, but in reality, a circuit for the vertically polarized wave and a circuit for the horizontally polarized wave are respectively provided inside each of the blocks. The reception circuits respectively include limiters 15v and 15h and reception amplifiers (amplification parts) 16v and 16h in addition to the frequency conversion part 12 described above.

The limiters 15v and 15h attenuate signals having large signal levels. In this way, even when transmission signals that could not be blocked by the circulators 14v and 14h are input to the reception system circuit, the reception system circuit can be protected.

The reception amplifiers 16v and 16h are configured by low noise amplifiers (LNAs) and the like. The reception amplifiers 16v and 16h amplify the signal levels of the reception signals so that the frequency conversion part 12 and the signal processing part 18 can perform signal processing appropriately. The reception signals amplified by the reception amplifiers 16v and 16h are output to the frequency conversion part 12.

The frequency conversion part 12 has two channels 17*v* and 17*h* for processing the vertically polarized wave and the horizontally polarized wave. The channels 17*v* and 17*h* convert reception RF signals input from the reception amplifiers 16*v* and 16*h* into transmission IF signals having lower frequencies and amplify the signal levels thereof, respectively. Further, the gains amplified by the channels 17*v* and 17*h*, respectively, are controlled by a gain adjustment part 23 (which will be described later) included in the radar device 1. The frequency conversion part 12 outputs reception IF signals resulting from the amplified signal levels to the signal processing part 18.

The signal processing part 18 performs appropriate signal processing on the reception IF signals input from each channel of the frequency conversion part 12. Examples of signal processing include, but are not limited to, quadrature detection, A/D conversion, Doppler velocity calculation, and the like. The result of the signal processing is output to the control part described above. The control part saves the result of the signal processing as weather data in a storage part (not shown) or transmits it to a data collection server (not shown) connected to the radar device 1 via a network.

The signal processing part 18 includes power detection parts 19*v* and 19*h* that detect the power (the signal levels) of the reception IF signals input from the two channels 17*v* and 17*h* of the frequency conversion part 12, respectively. The signal processing part 18 outputs detection results obtained by the power detection parts 19*v* and 19*h* to the gain adjustment part 23.

The radar device 1 includes, in addition to the circulators 14*v* and 14*h* described above, a path switching part (path switch) 20 that repeatedly switches the signal paths. The path switching part 20 includes a path 21 that extracts the transmission signals generated by the transmission signal generation part 11 (specifically, the transmission RF signals output from the frequency conversion part 12) before they are amplified by the transmission amplifier 13, and branches and outputs them to the channels 17*v* and 17*h* of the frequency conversion part 12.

Usually, the reception signals input to the two channels 17*v* and 17*h* of the frequency conversion part 12 are associated with receiving by the antenna 10 reflected waves associated with transmission of the detection signals from the antenna 10 based on the transmission signals. In addition, the path 21 functions as a signal path (return path) for returning the transmission signals generated by the transmission signal generation part 11 directly to the frequency conversion part 12 for a gain feedback control (to be described later). In the following description, the path 21 may be referred to as a calibration signal path, and transmission signals output to the frequency conversion part 12 via the calibration signal path 21 may be referred to as calibration signals.

The path switching part 20 includes two switch parts 25*v* and 25*h*. The respective switch parts 25*v* and 25*h* can switch between a state in which the reception amplifiers 16*v* and 16*h* are connected to the frequency conversion part 12 and the calibration signal path 21 is disconnected, and a state in which the reception amplifiers 16*v* and 16*h* are disconnected from the frequency conversion part 12 and the calibration signal path 21 is connected.

The respective switch parts 25*v* and 25*h* are configured to selectively connect one of the path from the reception amplifiers 16*v* and 16*h* and the calibration signal path 21 to the frequency conversion part 12. In this way, the calibration signals and echo signals from the antenna 10 can be prevented from being input to the frequency conversion part 12 at the same time. The path switching part 20 switches the connection/disconnection of the calibration signal path 21 at an appropriate timing in synchronization with the output of the transmission signals of the transmission signal generation part 11 by controlling the switch parts 25*v* and 25*h*. The details of the path switching timing by the path switching part 20 will be described later.

The path switching part 20 includes a power detection part 22 that detects the power (signal levels) of the extracted transmission signals. The path switching part 20 outputs the detection results obtained by the power detection part 22 to the gain adjustment part 23.

The gain adjustment part (amplification gain changing part (amplification gain adjuster)) 23 controls the gains amplified by the respective channels 17*v* and 17*h* of the frequency conversion part 12 based on detection values of the power detection part 22 included in the path switching part 20 and detection values of the power detection parts 19*v* and 19*h* included in the signal processing part 18 when the path switching part 20 outputs the calibration signals to the frequency conversion part 12. Here, the detection values of the power detection part 22 can be paraphrased as power detection values on the input side of the frequency conversion part 12, and the detection values of the power detection parts 19*v* and 19*h* can be paraphrased as power detection values on the output side of the frequency conversion part 12.

Although not shown in detail, the frequency conversion part 12 includes a number of components such as a local oscillator, a mixer and the like for frequency conversion. In this regard, the gain adjustment part 23 experimentally obtains the current gains in the respective channels 17*v* and 17*h* based on a ratio of the power detection values on the input side and the output side of the frequency conversion part 12. The gain adjustment part 23 controls the gains amplified by the respective channels 17*v* and 17*h* so that the gains are consistent with a gain target value stored in a gain target value storage part (gain target value storage) 24 included in the radar device 1. By this feedback control, even when the temperature characteristic of the frequency conversion part 12 exhibits complicated behavior, nonuniformity can be effectively suppressed.

The gain target value storage part 24 can be configured by a storage device such as a known nonvolatile memory and the like, and can store a particular gain target value. The gain target value stored in the gain target value storage part 24 is common to the two channels 17*v* and 17*h*. In this way, the gains are controlled so that the power ratio of the input to the output is consistent between the channels, whereby the deviation of the gains between the channels can be eliminated. Further, when a radar network is configured with multiple radar devices 1, the deviation among the radar devices 1 can be eliminated by making the gain target values stored in the gain target value storage parts 24 consistent with one another. In this way, a significant improvement in measurement accuracy can be realized.

The circulators 14*v* and 14*h*, the limiters 15*v* and 15*h*, and the reception amplifiers 16*v* and 16*h* disposed in the reception system circuit have a simple component configuration compared with the frequency conversion part 12, and the temperature characteristics can be uniquely obtained in advance (in addition, this also applies to a rotary joint (not shown) disposed between the circulators 14*v* and 14*h* and the antenna 10). Therefore, in the embodiment, regarding the individual differences and the temperature characteristics in this part, it is configured that parameters for correcting the deviation in gains are set in the signal processing part 18 before shipment from the factory, and that the nonuniformity is canceled by signal processing of the signal processing part 18.

As described above, the gains can be calibrated and maintained constant for the entire path of the reception signals from the antenna 10 to the signal processing part 18.

The gain target value storage part 24 is configured to be capable of changing the stored gain target value by an operation member such as a key and the like (not shown) provided in the radar device 1 being operated, or by the radar device 1 communicating with a management device (not shown). In this say, the reception gains of the frequency conversion part 12 can be flexibly changed.

Next, the connection/disconnection timing of the calibration signal path 21 included in the path switching part 20 and the power detection timing for gain adjustment will be described in detail with reference to FIG. 2. FIG. 2 is a timing chart showing the timings of transmission, reception and the like with the horizontal axis as the time axis.

As shown in FIG. 2, in the radar device 1 of the embodiment, a period in which the transmission signal generation part 11 outputs the transmission signals (hereinafter, it may also be referred to as a transmission period) and a period in which the antenna 10 inputs the received reception signals obtained by receiving reflected waves (hereinafter, it may also be referred to as a reception period) repeatedly and alternately appear.

Conventionally, in the transmission period, the respective channels 17*v* and 17*h* of the frequency conversion part 12 are in an idling state and are not particularly utilized. In this regard, in the embodiment, as a result of the calibration signal path 21 being connected during the transmission period, it is configured that the calibration signals are input to the respective channels 17*v* and 17*h*, and the frequency conversion and amplification of the calibration signals are performed.

Specifically, the calibration signal path 21 is connected by switching of the switch parts 25*v* and 25*h* slightly before the transmission period is started (at the same time, the reception amplifiers 16*v* and 16*h* are disconnected from the frequency conversion part 12). Thereafter, when the transmission period is started, the calibration signals are input to the two channels 17*v* and 17*h* of the frequency conversion part 12. At the timing which divides the transmission period into two equal parts, the power on the input side and the output side of the frequency conversion part 12 is detected, and the detection values are output to the gain adjustment part 23. Shortly after the power detection timing described above, the calibration signal path 21 is disconnected by switching of the switch parts 25*v* and 25*h* (at the same time, the reception amplifiers 16*v* and 16*h* are connected to the frequency conversion part 12).

In this way, in the embodiment, the connection of the calibration signal path 21 is performed before the start of the transmission period. Therefore, a time margin can be easily ensured in a period from the connection of the calibration signal path 21 to the detection of the power on the input side and the output side of the frequency conversion part 12. As a result, even if it takes some time to connect the calibration signal path 21 in the path switching part 20, the power detection can be performed correctly.

As shown in FIG. 2, the two reception amplifiers 16*v* and 16*h* are controlled so that the power disconnection control is started slightly before the transmission period starts, and that the signals from the limiters 15*v* and 15*h* are not output at the start timing of the transmission period. Further, at the start timing of the transmission period, the reception amplifiers 16*v* and 16*h* are disconnected from the frequency conversion part 12 by the switch parts 25*v* and 25*h* included in the path switching part 20. Since the power from the reception amplifiers 16*v* and 16*h* is disconnected in this way, a so-called transmission leakage signal can be prevented from being input to the frequency conversion part 12 when the frequency conversion part 12 performs frequency conversion and amplification of the calibration signals.

When the power on the input side and the output side of the frequency conversion part 12 is detected, the gain adjustment part 23 compares the current gains based on the obtained power for the respective channels 17*v* and 17*h* with the gain target value stored in gain target value storage part 24. When the current gains are less than the gain target value, the gain adjustment part 23 controls the frequency conversion part 12 to increase the amplification gains by a particular value from an immediately subsequent reception period, and when the current gains are greater than the gain target value, the gain adjustment part 23 controls the frequency conversion part 12 to decrease the amplification gains by a particular value. As described above, the amplification gains of the respective channels 17*v* and 17*h* can be feedback controlled.

After the power is detected and before the reception period is started at the timing shown in FIG. 2, the calibration signal path 21 is disconnected, and the reception amplifiers 16*v* and 16*h* are connected to the frequency conversion part 12. Further, the state in which the reception amplifiers 16*v* and 16*h* do not output the reception signals ends at the same time as the reception period starts. In this way, after the start of the reception period, the two channels 17*v* and 17*h* of the frequency conversion part 12 can amplify the reception signals as usual.

The radar device 1 of the embodiment is configured to change the amplification gains on the reception side in the frequency conversion part 12 without stopping the transmission of the detection signals from the antenna 10 and without changing the transmission interval of the detection signals. In this way, the calibration of the gains can be performed without affecting the detection around the antenna 10.

Further, the signal processing part 18 is configured to be capable of outputting the waveforms output from the two channels 17*v* and 17*h* of the frequency conversion part 12 to, for example, a display (not shown) not only in the reception period but also in the transmission period. In this way, the calibration signals can be used for maintenance work. For example, when the radar device 1 does not operate normally and some failure or the like is suspected, whether or not the transmission signals are normally output can be determined by whether or not the calibration signals are included in the waveforms output by the signal processing part 18. Therefore, it is easy to isolate the problem.

As described above, the radar device 1 of the embodiment includes the transmission signal generation part 11, the frequency conversion part 12, the signal processing part 18, the path switching part 20, and the gain adjustment part 23. The transmission signal generation part 11 repeatedly generates, at a time interval, the transmission signals to be output to the antenna 10 in order to transmit the detection signals from the antenna 10. The frequency conversion part 12 converts frequencies of the echo signals obtained by reflecting the detection signals and receiving the detection signals by the antenna 10, and amplifies the signal levels thereof, within a period from a time when the transmission signal generation part 11 completes outputting the transmission signals to the antenna 10 to a time when a next one of the transmission signal starts to be output to the antenna 10.

The signal processing part 18 processes the signals output by the frequency conversion part 12. The path switching part 20 outputs the transmission signals output by the transmission signal generation part 11 to the frequency conversion part 12 as the calibration signals at a timing while the transmission signals are being output to the antenna 10. The gain adjustment part 23 changes the amplification gains of the frequency conversion part 12 based on the signal levels of the calibration signals input to the frequency conversion part 12 and the signal levels of the calibration signals having been amplified by the frequency conversion part 12.

Further, in the radar device 1 of the embodiment, the reception gains are changed by the following method. That is, the transmission signals to be output to the antenna 10 in order to transmit the detection signals from the antenna 10 are repeatedly generated at a time interval. The frequencies of the echo signals obtained by reflecting the detection signals and receiving the reflected detection signals by the antenna 10 are converted, and the signal levels thereof are amplified by the frequency conversion part 12 within a period from a time when the output of the transmission signals to the antenna 10 is completed to a time when a next one of the transmission signals starts to be output to the antenna 10, and processing on the amplified signals is performed. At a timing while the transmission signals are being output to the antenna 10, the transmission signals are input to the frequency conversion part 12 as the calibration signals, and the frequencies of the calibration signals are converted by the frequency conversion part 12, and the signal levels thereof are amplified. The amplification gains of the frequency conversion part 12 are changed based on the signal levels of the calibration signals input to the frequency conversion part 12 and the signal levels of the calibration signals having been amplified by the frequency conversion part 12.

In this way, the current gains can be experimentally obtained and automatically controlled for the frequency conversion part 12 that generally has a large number of components and a complicated behavior of gain deviation. Therefore, nonuniformity of the gains caused by the individual differences, the temperature characteristics or the like of the components of the frequency conversion part 12 can be accurately and automatically calibrated. Moreover, since the current gains are detected by using the calibration signals, an automatic control of the gains can be realized without much complicating the configuration.

A preferred embodiment of the disclosure has been described above, but the above configuration can be modified as follows, for example.

The gain target value storage part 24 may be configured to store not only the gain target value of the frequency conversion part 12 but also the gain target value of the reception signal path including the frequency conversion part 12. In other words, the gain adjustment part 23 may be configured to change the amplification gains of the frequency conversion part 12 based not only on the temperature characteristic of the frequency conversion part 12 but also on the temperature characteristics of the circulators 14v and 14h, the limiters 15v and 15h, and the reception amplifiers 16v and 16h, for example.

The switch parts 25v and 25h may be configured as switches that simply switch the connection/disconnection of the calibration signal path 21. In this case, when the calibration signal path 21 is connected, the input of the echo signals from the reception amplifiers 16v and 16h to the frequency conversion part 12 is substantially blocked by the power disconnection control of the reception amplifiers 16v and 16h.

The connection of the calibration signal path 21 described above (that is, the feedback control of the reception gains) may not be performed for each output of the transmission signals. For example, it may be performed at an appropriate time interval such as once per hour.

The radar device 1 may be configured as a radar that transmits and receives only the horizontally polarized wave, for example, instead of being a dual polarization radar.

The radar device 1 is not limited to a weather radar but can be configured as a radar provided in a ship for detecting other ships, for example.

DESCRIPTION OF REFERENCE NUMERALS

1: Radar device
10: Antenna
11: Transmission signal generation part
12: Frequency conversion part
14v, 14h: Circulator (transmission and reception switching part)
16v, 16h: Reception amplifier (amplification part)
17v, 17h: Channel
18: Signal processing part
20: Path switching part
21: Calibration signal path
23: Gain adjustment part (amplification gain changing part)
24: Gain target value storage part

What is claimed is:

1. A radar device, comprising:
   a transmission signal generator which repeatedly generates, at a time interval, a transmission signal to be output to an antenna in order to transmit a detection signal from the antenna;
   a frequency convertor which converts a frequency of an echo signal obtained by reflecting the detection signal and receiving the detection signal by the antenna, and amplifies a signal level thereof, within a period from a time when the transmission signal generator completes outputting the transmission signal to the antenna to a time when a next one of the transmission signal starts to be output to the antenna;
   a processing circuitry which processes and outputs a signal input from the frequency convertor;
   a path switch which outputs the transmission signal output by the transmission signal generator to the frequency convertor as a calibration signal at a timing while the transmission signal is being output to the antenna; and
   an amplification gain adjuster which changes an amplification gain of the frequency convertor based on a signal level of the calibration signal input to the frequency convertor and a signal level of the calibration signal having been amplified by the frequency convertor.

2. The radar device according to claim 1, comprising:
   a circulator which separates signal paths, causes the transmission signal generated by the transmission signal generator to be output to the antenna, and causes the echo signal received by the antenna to be output to the frequency convertor; and
   a reception amplifier which amplifies and outputs to the frequency convertor a signal input from the circulator,
   wherein an input of the echo signal from the reception amplifier to the frequency convertor is blocked while the transmission signal generator is outputting the transmission signal to the antenna.

3. The radar device according to claim 1, wherein the path switch comprises a calibration signal path which is a signal path in which the transmission signal output by the transmission signal generator is output to the frequency convertor as a calibration signal, and the path switch disconnects the calibration signal path before the transmission signal generator completes outputting the transmission signal to the antenna.

4. The radar device according to claim 3, wherein the path switch connects the calibration signal path before the transmission signal generator starts outputting the transmission signal to the antenna.

5. The radar device according to claim 1, wherein the amplification gain adjuster changes the amplification gain of the frequency convertor based on at least a temperature characteristic of a circulator which is disposed between the frequency convertor and the antenna and switches signal paths.

6. The radar device according to claim 1, wherein the frequency convertor has two channels which frequency-convert two polarized waves orthogonal to each other and amplify signal levels thereof, respectively, and the amplification gain adjuster changes amplification gains of the respective channels, and makes a ratio of a signal level of the calibration signal input to the respective channels to a signal level of the calibration signal having been amplified by the respective channels be consistent between the two channels.

7. The radar device according to claim 1, wherein the amplification gain of the frequency convertor is changed by the amplification gain adjuster without stopping transmission of the detection signal from the antenna and without changing a transmission interval of the detection signal.

8. The radar device according to claim 1, comprising:

a gain target value storage which stores a gain target value which is a target value of a gain of the frequency convertor or a target value of a gain of a reception signal path comprising the frequency convertor, wherein the amplification gain adjuster changes the amplification gain of the frequency convertor based on the gain target value stored in the gain target value storage, and the gain target value stored in the gain target value storage is configured to be changeable.

9. The radar device according to claim 1, wherein the processing circuitry is capable of outputting the calibration signal that has been frequency-converted and amplified by the frequency convertor.

10. The radar device according to claim 1, wherein the radar device obtains weather observation data.

11. A method for changing a reception gain of a radar device, comprising:

repeatedly generating, at a time interval, a transmission signal to be output to an antenna in order to transmit a detection signal from the antenna by a transmission signal generator;

converting a frequency of an echo signal obtained by reflecting the detection signal and receiving the detection signal by the antenna and amplifying a signal level thereof, by a frequency convertor, within a period from a time when the transmission signal generator completes outputting the transmission signal to the antenna to a time when a next one of the transmission signal starts to be output to the antenna, and performing processing on an amplified signal by a processing circuitry;

inputting the transmission signal to the frequency convertor by a path switch as a calibration signal at a timing while the transmission signal is being output to the antenna, and converting a frequency of the calibration signal by the frequency convertor and amplifying a signal level thereof; and changing an amplification gain of the frequency convertor, by an amplification gain adjuster, based on a signal level of the calibration signal input to the frequency convertor and a signal level of the calibration signal having been amplified by the frequency convertor.

* * * * *